United States Patent [19]

Lei

[11] Patent Number: 5,593,195
[45] Date of Patent: Jan. 14, 1997

[54] IMPACT MODERATING MECHANISM FOR AUTOMOBILES

[76] Inventor: Fa-Chun Lei, Suite 1, 11 F, 95-8 Chang Ping Road, Sec. 1, Taichung, Taiwan

[21] Appl. No.: 506,388

[22] Filed: Jul. 24, 1995

Related U.S. Application Data

[63] Continuation of Ser. No. 19,098, Feb. 18, 1993, abandoned.

[51] Int. Cl.$^6$ ................................................ B60R 19/02
[52] U.S. Cl. ........................................... 293/134; 293/30
[58] Field of Search ............................... 293/134, 118, 293/5, 30

[56] References Cited

U.S. PATENT DOCUMENTS

| | | | |
|---|---|---|---|
| 1,375,574 | 4/1921 | Dodson | 293/30 |
| 1,803,078 | 4/1931 | Springfield | 293/132 X |
| 2,191,368 | 2/1940 | Cavanaugh | 293/30 X |
| 3,226,146 | 12/1965 | Behr | 293/132 X |
| 3,759,558 | 9/1973 | Komatsu | 293/134 X |
| 3,797,872 | 3/1974 | Watanabe et al. | 293/134 X |
| 3,917,020 | 11/1975 | Saab | 293/134 X |
| 4,014,582 | 3/1977 | MacKenzie | 293/134 X |
| 4,807,915 | 2/1989 | Shyi | 293/132 |
| 4,932,697 | 6/1990 | Hun | 293/134 X |
| 5,096,242 | 3/1992 | Chin-Hun | 293/134 X |

Primary Examiner—Joseph D. Pape

[57] ABSTRACT

An impact moderating mechanism for automobiles comprising a pair of identical bump wave absorbing and tranferring devices at two ends of a chassis respectively. Each of the bump wave absorbing and transferring devices have an outer bumper, a pair of first hydraulic cylinders, a pair of second hydraulic cylinders and a plurality of conduits thereof connected thereinbetween, which devices can functionally absorb a certain amount of bump wave firstly at one end, then transfers a large portion of the bump wave to be eliminated in the other end. A cross arrangement of the conduits for the first hydraulic cylinders thereinbetween can prevent an automobile subject to an impact from being swung and/or overturned. Futhermore, the absorbing capacity of bump wave shall be doubled for each of the collision automobiles if they are both equipped with this impact moderating mechanism.

6 Claims, 2 Drawing Sheets

IMPACT MODERATING MECHANISM FOR AUTOMOBILES

BACKGROUND OF THE INVENTION

This is a continuation application of U.S. patent application Ser. No. 08/019,098, Filed Feb. 18, 1993, which is now abandoned.

The present invention relates to impact eliminating devices particularly, to an impact moderating mechanism for automobiles which can provide further impact protection to a running automobile.

Any extent of external impact on a running automobile will cause a certain degree of damage because of the acceleration of gravity. If a pair of running automobiles are crashed from their opposite direction, the impact will be doubled because of their oppositional acceleration of gravity, therefore, causing unexpected heavy damage even fierce injury to the passangers.

Currently, there is a front bumper and a rear bumper formed on the ends of the chassis of an automobile to protect from an external impact and dampers equiped for absorbing heavy vibrations. But it is insufficient to protect a running automobile from heavy damage or the passangers from fierce injury.

SUMMARY OF THE PRESENT INVENTION

The main object of the present invention is providing an impact moderating mechanism for automobiles which offers further protection to the automobile subject to an external impact.

Another object of this invention is to provide a pair of identical outer bumpers on the front and rear portions of an automobile in cooperation with a plurality of hydraulic cylinders and conduits therebetween in order to absorb the bump wave therein and/or transfer the bump wave from one end to another.

Accordingly, the present invention of an impact moderating mechanism comprises a pair of identical, bump absorbing and transferring devises respectively equipped at two ends of a chassis. Each of the devices comprises an outer bumper, a pair of the first hydraulic cylinders perpendicularly secured on their fore ends thereof to the inner surface of an original bumper and connected with the outer bumper by a pair of the first cock stems which are perpendicularly secured on one end thereof to the inner surface of the outer bumper and other end to the fore side of a pair of valve gates which are vertically disposed inside the pair of the first cylinders and restrained by a pair of springs therein, a pair of leaf springs perpendicularly secured on their ends thereof to the inner surface of the outer bumper and connected via a pair of the second cock stems to a pair of the second hydraulic cylnders which are spacedly secured to the bottom of the floor panel. Each of the second cylinders has a valve gate vertically disposed and supported against a pair of resilient springs therein and three valve ports separately formed at front, rear and lateral periphery for passage in the second cock stem and the connection of a second and a supplementary conduit between the respective cylinders at both ends of the chassis. The conduits are arranged so as to facilitate the circulation of hydraulic fluid therein between the cylinders of opposite ends. When the pair of the second cock stems of one end are enforced to move inwardly subject to a certain external impact, the valve gates thereof are pushed to move to the rear portion of the second cylinders to press the hydraulic fluid out from therein and via the second conduits in order to force the valve gates in the second cylinders of the other end moving to push the second cock stems of their own outwardly so that the outer bumper of that end is actuated to make an outward movement. Whereby, the bump wave from one end of an automobile is effectively transferred and eliminated to the other end thereof without leaving a trace.

The pair of the first hydraulic cylinders secured to the lateral ends of the original bumper have been cross connected by a pair of the first conduits for facilitating the equalization of the bump strength when an external impact directs to a position other than the central portion of the outer bumper so as to maintain the bump wave on both ends of an automobile to be balanced in order to prevent the automobile from swinging and/or being overturned.

When an automobile is subject to an external impact, the bump wave is firstly absorbed by the pair of the leaf springs and the pair of the first hydraulic cylinders thereof. If the impact is strong enough to force the pair of the second cock stems to move further inwardly, the bump wave will be effectively transferred via the second hydraulic cylinders to the other end of the automobile for elimination. In particular, if two collision automobiles are both equipped with this impact moderating mechanism, the absorbing capacity of bump wave for each of them shall be doubled.

Further object and advantages will become apparent in a consideration of enusing the description and the drawings.

DETAIL DESCRIPTION OF THE PREFERRED EMBODIMENT OF THE PRESENT INVENTION

Figure 1:
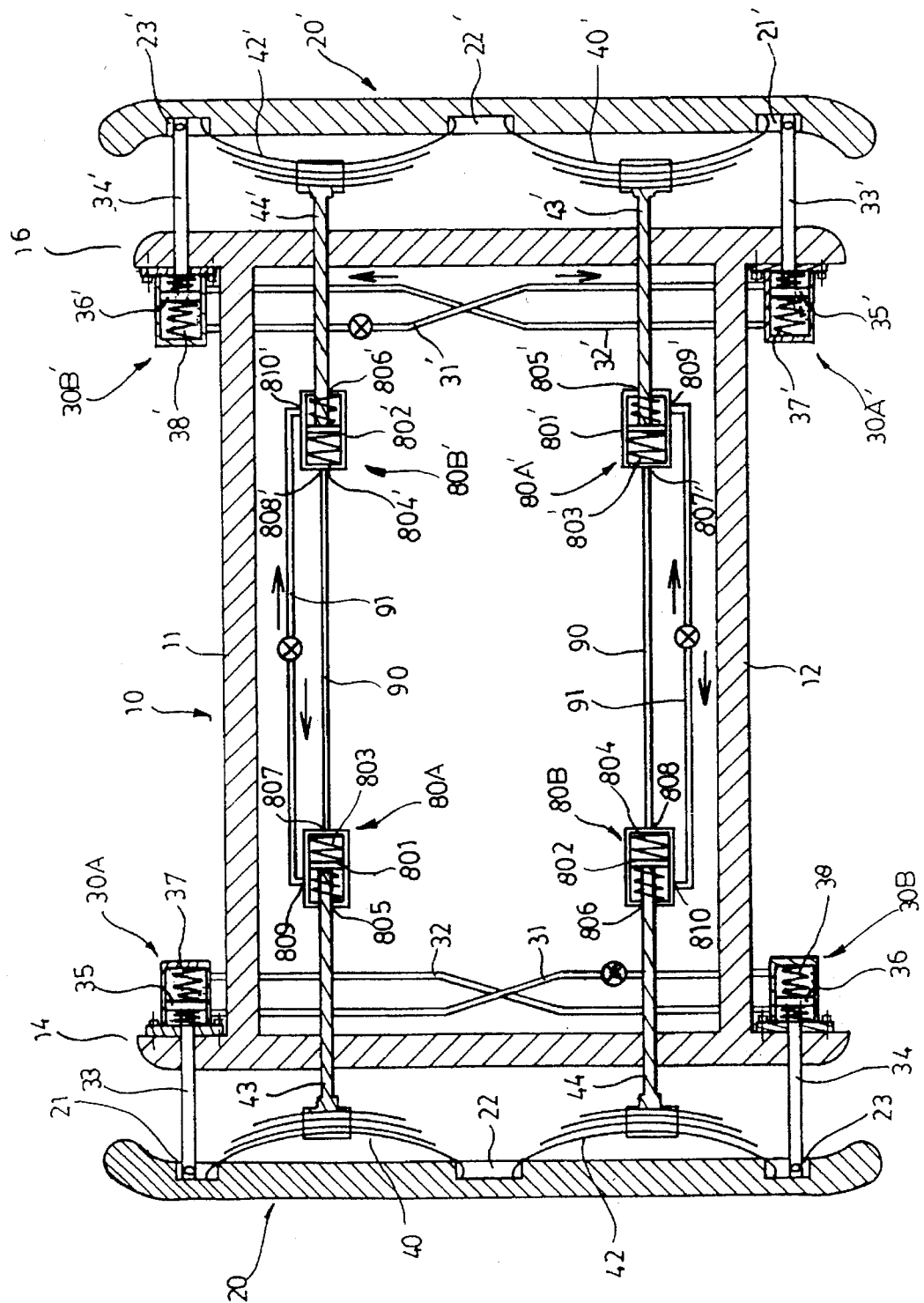
FIG. 1 is a top sectional view showing the preferred embodiment according to the present invention.
Figure 2:
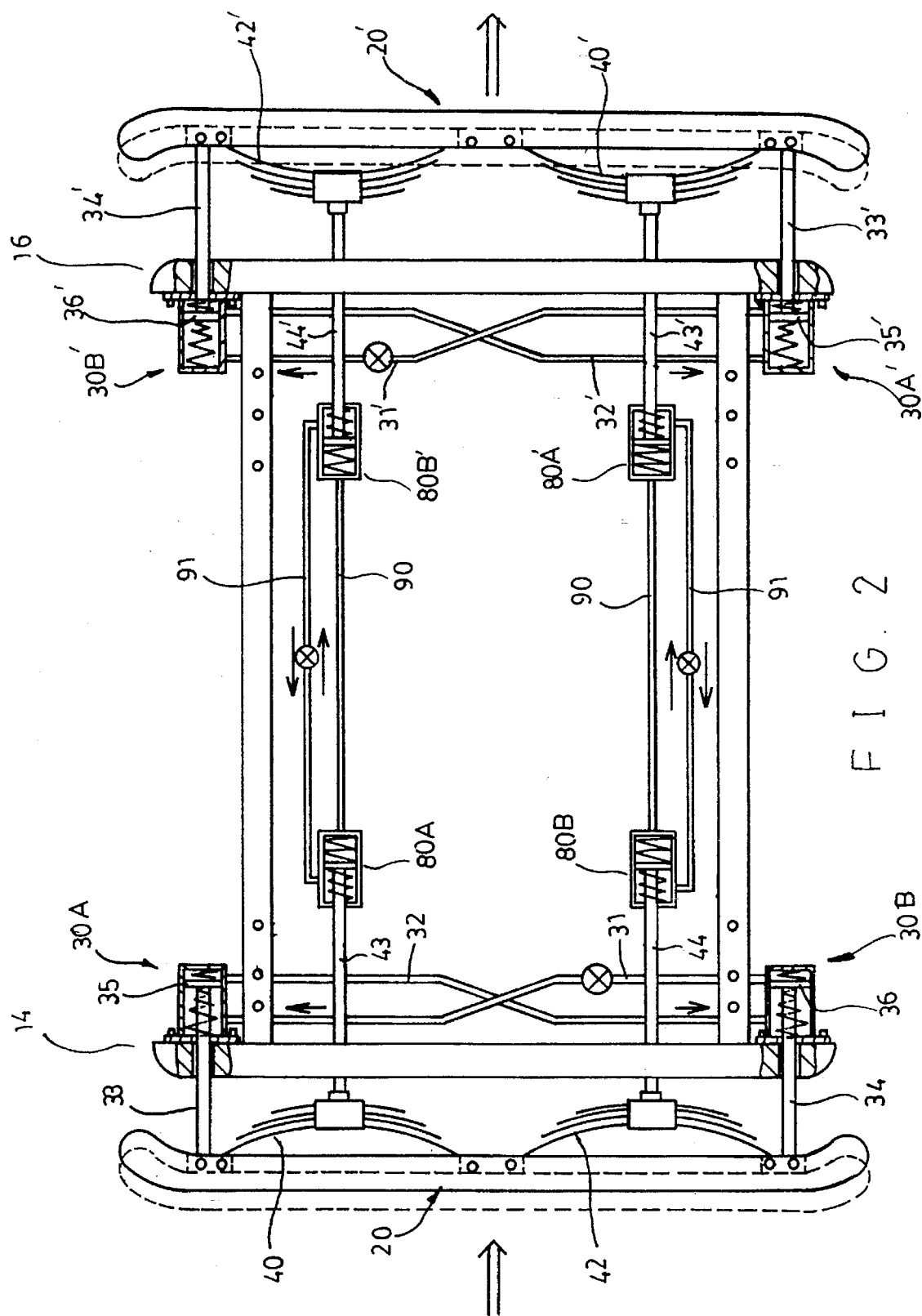
FIG. 2 is a top sectional view showing the preferred embodiment of the present invention when subjected to a certain external impact.

Referring FIG. 5, the present invention of an impact moderating mechanism for automobiles is comprised of a pair of identical bump wave transferring devices equipped respectively at two ends of a chassis 10. Each of the devices comprises an outer bumper 20 disposed parallel to and in front of an original bumper 14, a pair of the first hydraulic cylinders 30A and 30B, perpendicularly secured on their fore end to the inner surface of the original bumper 14 adjacent the lateral ends thereof, a pair of leaf springs 40 and 42 juxtaposedly secured on their bowed ends to the inner surface of the central portion of the outer bumper 20 and a pair of the second hydraulic cylinders 80A and 80B spacedly secured to the bottom of the floor panel along the axis of the automobile and connected with the leaf springs via a pair of second cock stems 43 and 44. The outer bumper 20 is generally a rectangular body having two ends bent inwardly and three rectangular cavities 21, 22 and 23 spacedly formed in row on the inner surface thereof for riveting one end of a pair of the first cock stems 33 and 34, and the pair of leaf springs 40 and 42 therein. Other ends of the pair of the first cock stems 33 and 34 pass through a pair of axial apertures adjacent the lateral ends of the original bumper 14 and then perpendicularly secure to the fore side of a pair of the first valve gates 35 and 36 respectively which are vertically stopped therein to define a fore and a rear portion of the first cylinders 30A and 30B and restrained by a pair of resilient springs 37 and 38 therein. The first cylinders 30A and 30B also include another pair of smaller springs respectively biased on the stems 33 and 34 at the fore side of the valve gates 35 and 36 which are normally positioned near the fore ends of the first cylinders 30A and 30B. A pair of the first conduits 31 and 32 are connected crosswise between the opposite lateral peripheries of the pair of the first hydraulic cylinders 30A and 30B so as to facilitate oil convection therebetween. The arrangement for cross connection of the conduits 31 and 32 is such that the conduit 31 or 32 is connected on one end to the fore portion of the the cylinder 30A and the other end to the rear portion of the cylinder 30B for example and then intersectionally secured themselves to the bottom of the floor panel and a hydraulic fluid control valve thereon which is positioned at one of the first conduits 31 or 32 to facilitate a flowage adjustment. The pair of the second cock stems 43 and 44 are respectively connected on one end to the arcuate center of the pair of leaf springs 40 and 42 and the other end parallel passed through a pair of axial apertures at the central portion of the original bumper 14, then perpendicularly connected to the second valve gates of the pair of the second hydraulic cylinders 80A and 80B on the under side of the floor panel. Each of the second hydraulic cylinders 80A and 80B has three valve ports 805,807 and 809 or 806, 808 and 810 separately formed at the two ends and the fore periphery thereof and a valve gate 801 and/or 802 vertically stopped and restrained by a pair of springs 803 and/or 804 to define a fore and a rear portion therein. The fore valve ports 805 and 806 slidably receive the pair of the second cock stems 43 and 43. The rear valve ports 807 and 808 connect a pair of the second conduits 90 respectively and the peripheral valve parts 809 and 810 connect the pair of supplementary conduits 91 respectively. The other ends of the above recited conduits 90 and 91 connect to the respective valve ports of the second hydraulic cylinders 80A' and 80B' at the other end of the automobile. A hydraulic fluid control valve is provided at the central portion of each of the supplementary conduits 91 for performing flowage adjustment. Because each of the cylinders contains a predetermined amount of hydraulic material, when an external impact strong enough is subjected to the front of the automobile (as shown in FIG. 6), both of the valve gates 801 and 802 will be pushed to move backward by the pair of the second cock stems 43 and 43 to compulsively press the hydraulic fluid inside the rear portion of the cylinders 80A and 80B into the rear portion of the cylinders 80A' and 80B' via the second conduits 90. Simultaneously, the valve gates 801' and 802' are pressed to move forward so as to actuate the outer bumper 20' on the rear portion of the automobile to make a outward movement by the second cock stems 43' and 44' for eliminating the bump wave. At the same time, the hydraulic fluid inside the fore portion of the cylinders 80A' and 80B' are pressed to flow out via the supplementary conduits 91 to recruit the hydraulic fluid shortage inside the fore portion of the cylinders 80A and 80B. If the impact unexpectedly subjects to a position other than the central portion of the outer bumper 20, one of the two first hydraulic cylinders 30A and 30B shall receive more bump force than the another. So that the valve gate 35 is supposedly to move deeper than that of the valve gate 36 and will creat a torsion force to affect the stability of the impact moderating mechanism of the automobile. The pair of the first conduits 31 and 32 are so cross-arranged as to functionally equalize the bump wave between the pair of the first hydraulic cylinders 30A and 30B such that when cylinder gate 35 is firstly enforced to move to the bottom of the cylinder 30A, the hydraulic fluid inside the rear portion thereof is pressed out via the conduit 32 into the fore portion of the cylinder 30B as the hydraulic fluid inside the rear portion of cylinder 30B is simultaneously pressed to flow out via the first conduit 31 to recruit the shortage inside the fore portion of cylinder 30A, therefore the valve gate 36 is also simultaneously moved inwardly the same extent as that of the valve gate 35 to the rear portion of cylinder 30B in order to maintain the structural equalization and to prevent an automobile under impact from swinging and/or being overturned.

Equivalently, if an impact is subjected to the rear portion of the automobile, this impact moderating mechanism will provide similar bump absorbing function as it does for that of the front portion, yet the bumper wave shall be smaller than that from the front portion. Furthermore, if two collision automobiles are both equipped with the same impact moderating mechanism of the present invention, the bump wave for both of them shall be doubly reduced.

Referring to FIG. 6 again, when the impact is light and the outer bumper 20 is slightly retreated backward, so that the bump wave is absorbed mostly by the pair of the leaf springs 40 and 42, and the pair of the first hydraulic cylinders 30A and 30B such that the leaf springs 40 and 42 become flattened and the valve gates 35 and 36 inside the cylinders 30A and 30B are pushed slightly backward by the pair of the first cock stems 33 and 34 to avoid heavy damage to the automobile.

Based on above discussed structure, the present invention of an impact moderating mechanism for automobiles provides the following features and advantages:

a) it provides an elastic impact-proof mechanism over prior art for effectively obviating certain extent of risk for an automobile subject to an impact, b) no matter whether the impact comes from the front or rear end of an automobile, the bump wave can be effectively transferred to the other end thereof to be absorbed without leaving a trace, c) the pair of the first hydraulic cylinders 30A and 30B in cooperation with the pair of the cross-arranged first conduits 31 and 32 thereinbetween can effectively equalize the bump wave when an impact comes from other than the central portion of the outer bumper 20 and prevent the automobile from being swung and/or overturned.

d) if two collision automobiles are equipped with the same impact moderating mechanism of the present invention, the eliminating capacity of bump wave for each of them shall be doubled.

The scope of this invention should be determined by the appended claims and their legal equivalents rather than by the examples given.

I claim:

1. An impact moderating mechanism comprising:

a pair of identical shock absorbing and transferring devices equipped one on each end of a chassis of an automobile respectively;

each said shock absorbing and transferring device comprising an outer bumper positioned parallel and in front of an original bumper of the automobile, a pair of first hydraulic cylinders perpendicularly and respectively secured with their fore ends adjacent to an inner surface of the lateral ends of said original bumper, each of first hydraulic cylinders having a cock stem passing through a first passage in said original bumper and a first valve port, said cock stem having a first end perpendicularly connected to an inner surface of said outer bumper and a second end perpendicularly connected to a first valve gate inside said first hydraulic cylinder and biased by a pair of first coil springs therein, a pair of first conduits connected crosswise to the inner peripheries of said first hydraulic cylinders;

a pair of second hydraulic cylinders spacedly and respectively secured on their upper peripheries to the bottom of the floor panel of said automobile, each of said second hydraulic cylinders having a second cock stem passing through a second passage on said original bumper which has a first end connected to one of a pair of leaf springs on said outer bumper and a second end connected to a second valve gate through a second valve port and biased by a pair of second coil springs;

said pair of leaf springs juxtaposed and connected to the inner surface of said outer bumper, each having a plurality of arcuate plates in progressive lengths and centrally packed by a packing member which has a tubular connecter with a portion facing inwards for coupling with said second cock stem;

a pair of second conduits for respectively connecting the rear ends of said pair of second hydraulic cylinders on one end of said chassis to the rear ends of said pair of hydraulic cylinders on the other end of said chassis; and a pair of supplementary conduits respectively connecting the outer peripheries of said pair of second hydraulic cylinders between two ends of said chassis thereof;

whereby said pair of first hydraulic cylinders and said pair of leaf springs can absorb a small portion of a bump wave on their own end when said outer bumper is subjected to an external impact and transfer a larger portion of the bump wave to the other end of said chassis.

2. An impact moderating mechanism according to claim 1, wherein said outer bumper comprises a rectangular body having two lateral ends bent inwardly and three rectangular cavities spaced apart on the inner surface for receiving said pair of first cock stems and the ends of a longest spring plate of said leaf springs therein.

3. An impact moderating mechanism according to claim 1, wherein said first and second hydraulic cylinders and said conduits contain a predetermined amount of hydraulic material.

4. An impact moderating mechanism according claim 1, wherein said first valve gates of said first hydraulic cylinders are normally positioned near the fore ends thereof.

5. An impact moderating mechanism according to claim 1, wherein said second valve gates of said second hydraulic cylinders normally positioned at appropriate medial portions thereof.

6. An impact moderating mechanism according to claim 1, further including a flowage control valve respectively provided on one of said first conduits at both ends of said chassis and each of said supplementary conduits.

* * * * *